United States Patent
Hudak et al.

(10) Patent No.: US 11,998,009 B2
(45) Date of Patent: *Jun. 4, 2024

(54) BIOSTIMULANT CONCENTRATE AND METHODS THEREOF

(71) Applicant: AG BIOTECH, INC., Livonia, NY (US)

(72) Inventors: Robert M. Hudak, Pompano Beach, FL (US); Tristan C. Hudak, Sacramento, CA (US)

(73) Assignee: AG Biotech, Inc., Livonia, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/164,434

(22) Filed: Feb. 1, 2021

(65) Prior Publication Data

US 2021/0251230 A1    Aug. 19, 2021

Related U.S. Application Data

(60) Provisional application No. 62/968,569, filed on Jan. 31, 2020.

(51) Int. Cl.
| | | |
|---|---|---|
| *A01N 43/22* | (2006.01) | |
| *A01N 25/04* | (2006.01) | |
| *A01N 25/22* | (2006.01) | |
| *A01N 25/30* | (2006.01) | |
| *A01N 31/02* | (2006.01) | |
| *A01P 21/00* | (2006.01) | |

(52) U.S. Cl.
CPC ............ *A01N 43/22* (2013.01); *A01N 25/04* (2013.01); *A01N 25/22* (2013.01); *A01N 25/30* (2013.01); *A01N 31/02* (2013.01); *A01P 21/00* (2021.08)

(58) Field of Classification Search
CPC ........ A01N 43/22; A01N 25/04; A01N 25/22; A01N 31/02; A01N 63/00; A01N 25/30; C05F 11/10; C05G 3/60; C05G 5/23; A01P 21/00

See application file for complete search history.

(56) References Cited

U.S. PATENT DOCUMENTS

| | | | |
|---|---|---|---|
| 4,411,685 A * | 10/1983 | Welebir | A01N 31/02 504/125 |
| 4,605,430 A * | 8/1986 | Godrej | C05F 11/10 71/64.08 |
| 2009/0075818 A1* | 3/2009 | Rahman Nia | A01N 59/16 424/618 |
| 2019/0075796 A1 | 3/2019 | Mandava | |
| 2021/0251231 A1 | 8/2021 | Wang et al. | |

FOREIGN PATENT DOCUMENTS

CN    109251082 A  *  1/2019

OTHER PUBLICATIONS

M. Naeem, M. Masroor A. Khan and Moinuddin, "Triacontanol: a potent plant growth regulator in agriculture", Journal of Plant Interactions, vol. 7, No. 2, Jun. 2012, 129-142. (Year: 2012).*

Stanley Ries, Violet Wert, and John A. Biernbaum, "Factors Altering Response of Plants to Triacontanol", Journal of the American Society for Horticultural Science, 108(6), 917-922, 1983. (Year: 1983).*

* cited by examiner

Primary Examiner — John Pak
Assistant Examiner — Nathan W Schlientz
(74) Attorney, Agent, or Firm — Kevin H. Fortin

(57) ABSTRACT

A biostimulant concentrate for direct application to agricultural crops comprising purified water and a solubilizer, triacontanol in a concentration of between 500-4000 milligrams per liter (mg/l), brassinolide in a concentration of between 30-120 milligrams per liter (mg/l), and a stabilizer is selected from the group consisting of nano silver, nano copper, and combinations thereof.

11 Claims, 1 Drawing Sheet

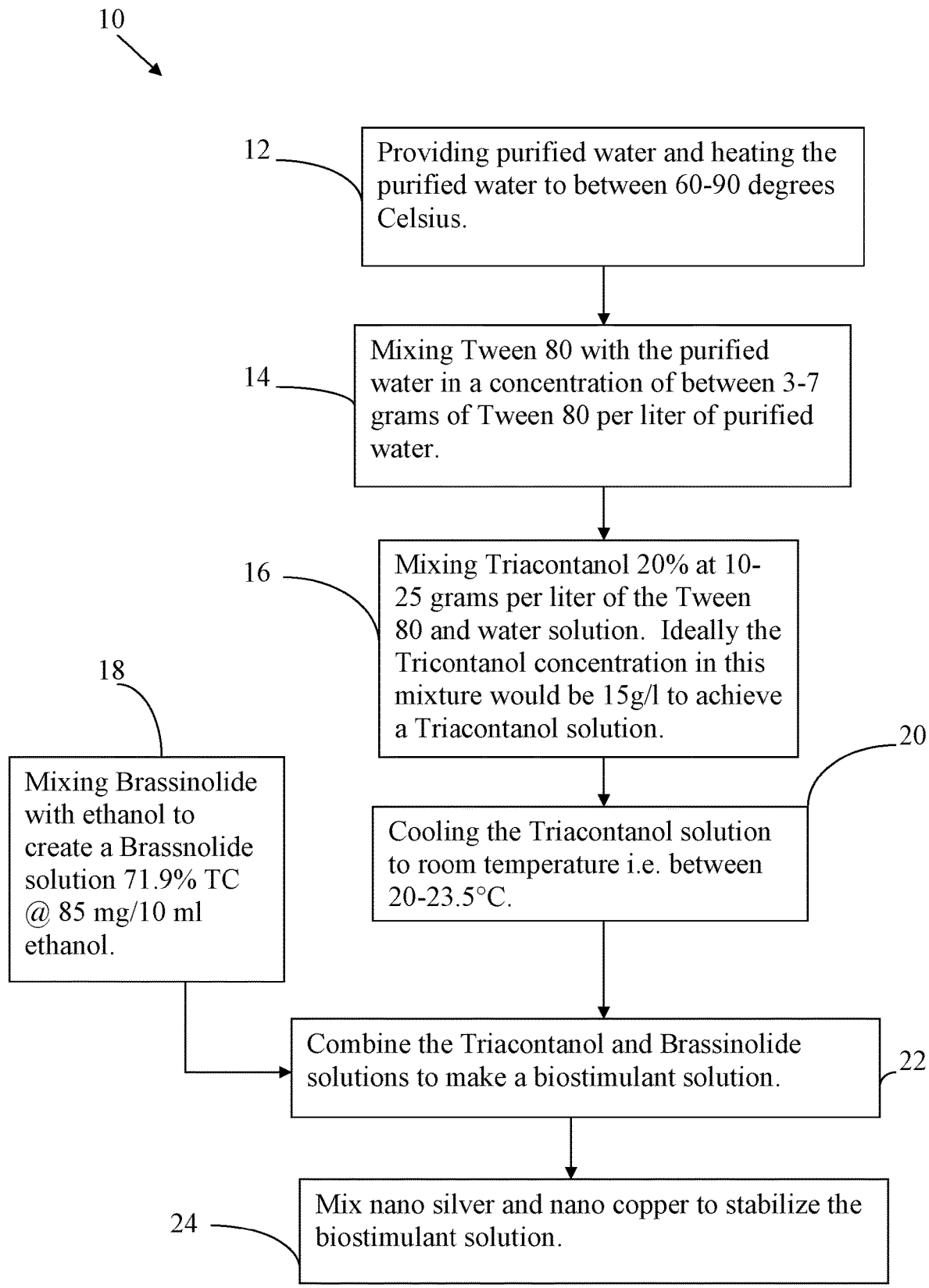

BIOSTIMULANT CONCENTRATE AND METHODS THEREOF

This application claims priority to U.S. Provisional Application No. 62/968,569 filed Jan. 31, 2020, the entirety of which is incorporated herein by reference.

FIELD OF THE INVENTION

This invention relates to biostimulants used on agricultural soils and crops. More particularly, this invention relates to the manufacture and use of particular biostimulants.

BACKGROUND OF THE INVENTION

Plant biostimulants are defined as those containing substance(s) and/or micro-organisms whose functions when applied to plants or soils are to stimulate natural plant growth processes. This can result from enhancing nutrient uptake, nutrient absorption efficiency, or improved tolerance to abiotic stresses.

The current global market size is over 2 Billion Dollars annually and is growing rapidly. The understanding in agriculture is that biostimulants bolster the strength of the crops to increase yield while minimizing the costs for fertilizers, pesticides, fungicides and herbicides.

Many biostimulants made from fermentation product suspensions are prone to settling. Agitation prior to use is common to assure consistency in dispersion and bio-effects.

Biostimulant suspensions derived from fermentation products are also prone to microbial contamination. In many cases, such biostimulant suspensions are pH adjusted to minimize microbial growth. This is accomplished by adjusting the pH to between 3.5-4. pH adjustment is typically accomplished by mixing an acid such as citric acid, sulfuric acid, phosphoric acid, or potato wash, for examples with a buffer to make the fermentation product suspension.

With many pH adjusted fermentation product suspensions, the pH can change when the suspension is exposed to excessive heat and ambient air. Changes in pH can result in product destabilization including change of color, odor, shrinking or swelling, bursting of the container, reduced efficacy, and other undesirable consequences of destabilization.

Biostimulants can be heavy and bulky and thus, more costly to ship and store. This is due to high concentrations of water in the product.

Some biostimulants are produced by using yeast fermentation. Genetic drift and variation of substrate composition may alter the biostimulant fermentation products. This may impact the quality and efficacy of biostimulants produced from batch to batch, and over time.

There are many other biostimulants on the market often consisting of humic acid or fulvic acid as the main constituents, often with the addition of macro or micro nutrients. Some use amino acids as the main active agents, and some have a combination of all of the above.

Vitazyme® is a fermented suspension including vitamins, enzymes, tricontanol, brassinolide, and other growth stimulators. It is used successfully to enhance crop yields for a variety of crops. Brassinolide is in a concentration of 0.0022%-0.0059% and triacontanol is concentrated in the range of 0.012%-0.019%. The pH is adjusted and stabilized to a pH of 3.5-4 by the addition of a strong acid to stabilize the formulation, and to inhibit microbial contamination. The recommended application rate is 13 oz/acre. The triacontanol to brassinolide ratio is thus within the range of 0.545 to 3.22.

What is desired is a biostimulant that optimizes the triacontanol to brassinolide ratio for optimal efficacy. What is also desired is a biostimulant that is concentrated for ease in storage, shipping and application and can be applied to crops with an application rate of less than 13 oz/acre. What is also desired is a biostimulant that can be produced with a consistency that exceeds the consistency demonstrated by traditional batch fermentation processes. What is further desired is a biostimulant that can be stabilized for improved shelf life without requiring the use of a strong acid. What is further desired is a biostimulant that, when applied to agricultural crops or soil, maximizes crop yield and quality.

SUMMARY OF THE INVENTION

The present invention is an Emulsion in Water (EW) or Aqueous Solution formulated from Triacontanol 20% TC and Brassinolide 60-90% TC. TC means technical concentration and is a concentration determined on a weight to weight w:w basis. Tricontanol has a density of 0.777 g/ml at 95° ° C. Brassinolide has a density of 1.141 g/ml.

Triacontanol is a fatty alcohol that is also known as melissyl alcohol or myricyl alcohol. It can be derived from plant cuticle waxes and beeswax and other sources.

A non-ionic surfactant derived from sorbitan esters, such as Tween 80®, which is a registered trademark of Croda Americas, Inc. The surfactant is used as an emulsifier and solubilizer. Tween 80® is also known as polyethylene glycol sorbitan monooleate. It has the chemical formula $C_{64}H_{124}O_{26}$. This surfactant is considered safe enough to use in human foods, including ice cream. Tween 80 and its analogues are important for enabling emulsification and concentration of the various elements of present invention.

Ethanol or other alcohol can also be used to optimize emulsification, particularly by enabling the incorporation of functional compounds that are not favorably soluble in either water or oil so that these functional compounds are emulsified effectively. In particular in order to achieve a desired concentration of brassinolide, it must be mixed with ethanol or an analogue thereto.

Nano silver and nano copper are used to preserve the present invention by inhibiting microbial growth, and thus being effective stabilizers. Nano in this patent application means a particle sized between 1-100 nanometers in diameter. Thus, nano copper and nano silver include a sufficient amount of particles of each having a diameter within the range of 1-100 nm to have detectable or predictable antimicrobial effects in solution.

Triacontanol increases chlorophyll content of the leaves of crops, increases $CO_2$ assimilation, and enhances photosynthesis. Through a number of mechanisms of action, Triacontanol triggers a cascade of metabolic events typically resulting in increased crop yield.

Brassinolide promotes stem elongation and cell division; promotes vascular differentiation; protects plants during cold and drought stress; accelerates senescence; promotes resistance to salt stress; increases the metabolism of plants, and helps overcome pesticide toxicity.

The present inventive formulation can be used as an in-furrow application mixed with fertilizer; mixed with herbicide and broadcast sprayed pre or post emergence; mixed with fungicides, insecticides, or fertilizers as a foliar spray; used as a foliar spray mixed with water; applied via drip or overhead irrigation, and used as a seed treatment.

BRIEF DESCRIPTION OF THE DRAWINGS

FIG. 1 is a flow chart of a method of manufacturing the present invention.

DETAILED DESCRIPTION

The biostimulant of present invention is referred to as Bio Shot.

Bio Shot is a stable solution or emulsion and its constituents do not normally settle, ever after great periods of time and over varied temperature ranges. The solution is concentrated for easy transportation and storage. The solution does not need to be shaken prior to use so dispersion is consistent when the solution is sprayed on crops or soils.

In a preferred embodiment, the biostimulant contains at least 0.003% (preferably between 0.006% and 0.0162%) brassinolide and at least 0.02% (preferably between 0.02-0.5%) triacontanol. More preferably, a concentration of 0.3% triacontanol is used. In one embodiment of the invention the Bio Shot products contains 3000 parts per million (ppm) of Triacontanol, derived from Tricontanol 20% TC. The present invention perfects the steps of achieving solubility and long term shelf stability of these active ingredients.

The solution is stable, milky white in appearance, and will not expand or burst its container under ambient conditions.

The brassinolide is a plant growth hormone having the chemical formula $C_{28}H_{48}O_6$. It is extracted from rape seed pollen, is analyzed by High Pressure Mass Spectrometry to determine purity, and then mixed with ethanol to produce a water soluble solution.

The triacontanol is a plant growth stimulant having the chemical formula $C_{30}H_{62}O$. The triacontanol is preferably derived from rice bran wax and formulated to 20% TC.

TC as used herein means the technical concentration where the percentage is a weight to volume ratio as measured in grams per liter. For example 15 gms of Triacontanol having a TC of 20% equals 3 grams per liter, which is approximately 3000 parts per million (ppm) when made water soluble by mixing with Tween 80 in heated water.

The Bio Shot solution contains as much as 2.7 times more brassinolide and 25 times more triacontanol than Vitazyme®, depending on the batch of Vitazyme® tested.

Bio Shot is stabilized by adding nano silver and nano copper having a pH of between 6.2-6.4. The bio shot effective application concentration is 1.35 oz/acre, one tenth that of Vitazyme®. The invention includes applying the bio shot solution in a concentration of between 1-3 oz/acre.

Bio Shot is not created through an uncontrolled and non-sterile fermentation process like competing products but, instead, is derived from a unique process or method described herein.

FIG. 1 is a flow chart of a method in accordance with the present invention, generally designated with the reference numeral 10.

The method 10 includes the step 12 of providing purified water and heating the purified water to between 60-90 degrees Celsius at ambient pressure. The purified water can be distilled or reverse osmosis filtered. In a preferred embodiment, the temperature is 80° C.+/−1° C. to optimize solubility of the active components in subsequent steps. In another embodiment the temperature range is 80° C.+/−10° C. Normally the temperature will not exceed 100° C.

The method 10 includes the step 14 of mixing Tween 80 ($C_{64}H_{124}O_{26}$) with the purified water in a concentration of between 3-7 grams of Tween 80 per liter of purified water. In a preferred embodiment the concentration in grams per liter of the Tween 80 and the purified water is 5 grams per liter+/−1 gram. This yields a Tween and water solution.

The method 10 further includes the step 16 of mixing Triacontanol 20% at 10-25 grams per liter of the Tween 80 and water solution. Ideally the Tricontanol 20% concentration in this mixture is 15 g/l+/−1 gram to yield a Triacontanol solution.

The step 18 includes cooling the Triacontanol solution to room temperature i.e. between 20-23.5° C.+/−5° C. to enable the optimal addition of Brassinolide. Preferably the Brassinolide is in an ethanol solution to optimize solubility of the Brassinolide in the Triacontanol solution. The ethanol solution enables the desired concentrations of Brassinolide to be achieved in step 22 where the Triacontanol and Brassinolide solutions are mixed to achieve a biostimulant solution.

The step 24 includes mixing nano silver and nano copper to stabilize biostimulant solution and inhibit microbial growth. This method can be performed in a clean room that enables a maximum of 10,000 particles greater than 0.5 μm per cubic feet of volume to minimize microbial contamination of the biostimulant solution.

Compelling data indicates that the claimed formulation for Bio Shot has exceptionally effective results in terms of yield and quality of agricultural products. BioShot 40 refers to a trial application of 40 ml/acre and BioShot 80 refers to a trial application of 80 ml/acre. Preferably the BioShot of the present invention is a concentrate that is applied to crops in volumes of less than 100 ml/acre and preferably, between 40-80 ml/acre.

BioShot at 40 ml/acre and BioShot at 80 ml/acre is manufactured utilizing the concentrations and ratios described herein including the ratios of triacontanol to brassinolide, which are essential to achieve the goals of the invention. The BioShot biostimulant concentrate has brassinolide and triacontanol in a ratio of between 2:100 to 2.5:100 on a w:w basis in one embodiment of the invention. Achieving a concentrated product enables shipping and application convenient and effective, reducing shipping costs, and enabling ease in handling the product.

In one embodiment, the minimum amount of these active ingredients includes a brassinolide concentration of at least 50 mg/l and a triacontanol concentration of at least 2000 mg/l. Preferably, the brassinolide concentration is a minimum of 60 mg/l and the triacontanol concentration is at least 3000 mg/l.

In another aspect of the invention, the BioShot biostimulant concentrate has a ratio of triacontanol to brassinolide that is less than 30.86:1 on a w:w basis. More preferably, the BioShot biostimulant has the ratio of triacontanol to brassinolide is between 3.33:1 on a w:w basis to 30.86:1 on a w:w basis.

The biostimulant concentrate has a pH of between 6.2-6.4. Thus the biostimulant concentrate is not made with a strong acid, and does not use acidification to achieve shelf stability, stabilization, or microbial resistance. Instead, stabilization and microbial resistance is achieved in part, or solely, by the use of metals having nano-sized particles. Such metals include combinations of copper and silver.

As used herein the term "nano" and "nano-sized" means, in terms of a particle, a mean or average diameter of between 1 nanometer and 1 micron. One nanometer is a billionth of a meter. A single gold atom, for example is three nanometers in diameter. Here nano-sized particles are typically 1-100 nanometers in diameter.

Various examples of the use of the present invention are described as follows:

Example 1 with Corn 180 day maturity corn was treated with Bio Shot at 40 ml/ac. sprayed to leaves and yielded 196.1 bu./ac or a 26.9% increase over the untreated crop grown under similar conditions.

Example 2 with Peanuts

A 12.67×30 ft. plot, four replicate, completely randomized trial was carried out in Georgia-09B peanuts, planted on June 12, and harvested on Dec. 1, 2020 in Memphis, TN, on a good fertility and drainage Falaya silt loam soil.

Bio Shot biostimulant at 40 ml/ac was applied in-furrow at planting, followed by four foliar sprays of Bio Shot at 40 ml/ac, on July 10. July 24, August 7 and September 4, at 28, 42, 56 & 84 days after planting (DAP), respectively. Bio Shot foliar sprays were carried out with CO2-pressured backpack, attached to two 8002 flat-fan nozzles per row, at 30 PSI, with 15 gal/ac. spray volume.

The above-quoted Bio Shot program yielded 361 lb./ac or 14% significantly higher than untreated control.

Example 3 with Sweet Potato

A 12.67×30 ft. plot, four replicate, completely randomized trial was carried out in Beauregard sweet potato, planted on July 1, and harvested on Dec. 1, 2020, in Memphis, TN, on a good fertility and drainage Falaya silt loam soil.

Bio Shot biostimulant at 60 ml/ac was applied in-furrow at transplanting, followed by two foliar sprays of Bio Shot at 40 ml/ac, on September 4 & October 16, 65 & 107 days after transplanting (DAT), respectively. Bio Shot foliar sprays were done with CO2-pressured backpack, attached to two 8002 flat-fan nozzles per row, at 30 PSI, with 15 gal/ac. spray volume.

This Bio Shot program yielded 2545 lb./ac or 12% significantly higher than untreated control.

Example 4 Cotton

A 12.67×30 ft. plot, four replicate, randomized trial, was carried out in DP 1646B2FX cotton, planted on May 23 and harvested on Nov. 19, 2020 in Memphis, TN on a good fertility and drainage Falaya silt loam soil.

Bio Shot biostimulant foliar sprays were implemented with CO2-pressured backpack, attached to two 8002 flat-fan nozzles per row, at 30 PSI, with 15 gal/ac. spray volume, on 4 occasions: June 27, July 15, August 7 and Aug. 31, 2020, at 35, 53, 76 & 100 days after planting (DAP), in stage majority percentages (BBCH Scale) of 51%, 60%, 67% and 80%, respectively.

Bio Shot at 40 ml/ac. sprayed to leaves on 4 occasions: at 35, 53, 76 & 100 DAP, yielded in seed cotton and in lint: 352 lb/ac and 137 lb/ac, respectively, or 15% significantly higher than the untreated control.

The BBCH Scale is a framework for identifying phonological development stages of plants. Particular BBCH Scales are crop specific. The Acronym BBCH means "Biologische Bundesanstalt, Bundessortenat und Chimische Industrie" in the German language.

Example 5 Winter Wheat

A 6×30 ft plot, 4-replicate trial, in Turbo winter wheat, was planted in Memphis, TN, on Oct. 18, 2019, on a pH 6.1, 1.8% OM, good fertility and good drainage Falaya silty loam soil, and harvested on Jul. 7, 2020. A single foliar spray with a BACCAI $CO_2$ backpack sprayer, attached to 2 flat-fan 8002 nozzles per row, in 15 gal/ac spray volume, took place at flag leaf stage, on Apr. 6, 2020, when there was some *Septoria* Leaf Spot pressure. The following results were attained.

Caramba fungicide 14 fl oz/ac alone showed the significantly lowest yield (61.1 bu/ac) and the lowest net profit among the four evaluated treatments.

Crops treated with Bio Shot 40 ml/ac yielded 4.4 bu/ac or 7.2% significantly higher than crops treated with Caramba 14 fl oz/ac alone.

In view of the above examples, the present invention and methods of application thereof can benefit agricultural yields for a variety of crops including grains, tubers, maize, and legumes including peanuts, and soybeans. The present invention has also been tested successfully with cruciferous vegetables, nightshades, and tree fruit including cabbage, apples and tomatoes.

It can be appreciated that the present invention is also useful for most agricultural crops. This is a significant benefit of having the present invention, as it can be used for most commercial crops. This makes storage and transportation more efficient for the user.

One method of synthesizing nano-copper (copper nanoparticles having a diameter of between 1-100 nanometers) involves the copper (II) hydrazine carboxylate salt which undergoes a radical reaction with radical hydrogen produced by ultrasounds to form nanoparticles, hydrogen peroxide, and hydrazine carboxylic acid.

A method of synthesizing nano-silver (silver nanoparticles having a diameter of between 1-100 nanometers) includes citrate reduction, reduction via sodium borohydride, monosaccharide reduction as well as the polyol process.

Biological synthesis has also been used to make agricultural-ready nano-silver. This includes the biological synthesis of nanoparticles without requiring the use of reducing agents like sodium borohydride, and to limit the tendency of the nanoparticles to aggregate.

Although the inventions herein are described by way of example above, the particular scope of the invention is described in the appended claims.

We claim:
1. A biostimulant concentrate in liquid form comprising:
   purified water;
   a solubilizer, wherein the solubilizer is polysorbate 80 and is present in the biostimulant concentrate in a concentration of between 3-7 g/l;
   triacontanol; and
   brassinolide;
   wherein the weight ratio of brassinolide to triacontanol is between 1:50 to 1:40.
2. The biostimulant concentrate as set forth in claim 1, wherein the pH of the biostimulant concentrate is 6.2.
3. The biostimulant concentrate as set forth in claim 1, wherein the pH of the biostimulant concentrate is between 6.2-6.4.

4. A method of preparing a biostimulant concentrate comprising the steps of:
  providing and heating purified water to between 60-90° C.;
  mixing a solubilizer with the purified water, wherein the solubilizer is polysorbate 80 and is mixed with the purified water in a concentration of between 3-7 g/l to obtain a solubilizer solution;
  mixing triacontanol with the solubilizer solution to obtain a triacontanol solution;
  cooling the triacontanol solution to room temperature, wherein the temperature is between 20-23.5° C.; and
  mixing brassinolide with the triacontanol solution to obtain the biostimulant concentrate;
  wherein the weight ratio of brassinolide to triacontanol is between 1:50 to 1:40.

5. The method as set forth in claim 4, wherein the biostimulant concentrate comprises the solubilizer in a concentration of 5 g/l.

6. The method as set forth in claim 4, wherein the biostimulant concentrate comprises the brassinolide in a concentration of approximately 60 mg/l.

7. The method as set forth in claim 4, wherein the biostimulant concentrate comprises the triacontanol in a concentration of approximately 3000 mg/l.

8. The method as set forth in claim 4, wherein the pH of the biostimulant concentrate is at least 6.2.

9. The method as set forth in claim 4, wherein the pH of the biostimulant concentrate is between 6.2-6.4.

10. The method as set forth in claim 4, wherein the biostimulant concentrate comprises the brassinolide in a concentration of approximately 60 mg/l and the triacontanol in a concentration of approximately 3000 mg/l, having a weight ratio of brassinolide to triacontanol of approximately 1:50.

11. The method as set forth in claim 4, wherein the biostimulant concentrate comprises the brassinolide in a concentration of at least 50 mg/l and the triacontanol in a concentration of at least 2000 mg/l, having a weight ratio of brassinolide to triacontanol of approximately 1:40.

* * * * *